United States Patent
Sato

(10) Patent No.: US 6,688,356 B1
(45) Date of Patent: Feb. 10, 2004

(54) PNEUMATIC TIRE

(75) Inventor: Hiroshi Sato, Saitama-ken (JP)

(73) Assignee: Bridgestone Corporation, Tokyo (JP)

( * ) Notice: Subject to any disclaimer, the term of this patent is extended or adjusted under 35 U.S.C. 154(b) by 247 days.

(21) Appl. No.: 09/057,383

(22) Filed: Apr. 9, 1998

(30) Foreign Application Priority Data

Apr. 23, 1997 (JP) ............................................. 9-106235
Jan. 27, 1998 (JP) .......................................... 10-014090

(51) Int. Cl.⁷ ..................... B60C 11/03; B60C 11/11; B60C 103/00; B60C 107/00
(52) U.S. Cl. .................................. 152/209.18; 152/902
(58) Field of Search ........................... 152/209.2, 209.3, 152/209.8, 209.9, 209.18, 902, DIG. 3

(56) References Cited

U.S. PATENT DOCUMENTS

| | | | | |
|---|---|---|---|---|
| 2,006,197 A | * | 6/1935 | Ewart et al. | ............. 152/209.2 |
| 2,770,279 A | * | 11/1956 | Harrison | ................ 152/209.28 |
| 4,299,264 A | * | 11/1981 | Williams | ............... 152/209.28 |
| 4,456,046 A | * | 6/1984 | Miller | .................... 152/209.28 |
| 4,732,194 A | * | 3/1988 | Saneto et al. | .......... 152/209.28 |
| 5,054,530 A | * | 10/1991 | Shiraishi | ................... 152/209.8 |
| 5,385,187 A | * | 1/1995 | Kajiwara et al. | ............ 152/902 |
| 5,431,208 A | * | 7/1995 | Aoki et al. | .................. 152/902 |
| 5,746,849 A | * | 5/1998 | Hutson et al. | ........... 152/209 R |
| 6,012,499 A | * | 1/2000 | Masaoka | ................ 152/209.28 |

FOREIGN PATENT DOCUMENTS

| | | | | |
|---|---|---|---|---|
| DE | 3424796 | * | 1/1985 | ............. 152/209.18 |
| EP | 357 462 | | 3/1990 | |
| EP | 402 021 | | 12/1990 | |
| EP | 513 787 | | 11/1992 | |
| JP | 2-24204 | * | 1/1990 | ............. 152/DIG. 3 |
| JP | 4-133805 | * | 5/1992 | ............. 152/209.18 |
| JP | 5-254311 | * | 10/1993 | ............. 152/209.28 |

OTHER PUBLICATIONS

Patent Abstracts of Japan, V11, N71, JP 61–226304, Oct. 8, 1986.

Patent Abstracts of Japan, V12, N311, JP 63–082806, Apr. 13, 1988.

* cited by examiner

Primary Examiner—Steven D. Maki
(74) Attorney, Agent, or Firm—Sughrue Mion, PLLC

(57) ABSTRACT

An angle, which is formed by a tire leading edge side contour line of a ground-contact configuration and a side surface of a leading edge side of a block of a first block row disposed along a tire circumferential direction, and an angle, which is formed by the tire leading edge side contour line of the ground-contact configuration and a side surface of a leading edge side of a block of a second block row disposed parallel to and asymmetrically to the first block row, are set to be substantially equal. In this way, levels of pitch noises of the first block row and the second block row can be made equal. By adjusting tire circumferential direction phases of blocks of the first block row and the second block row, the pitch noises of the same level interfere with one another. A reduction in pattern noise is thereby achieved without changing a negative ratio.

9 Claims, 16 Drawing Sheets

F I G. 12
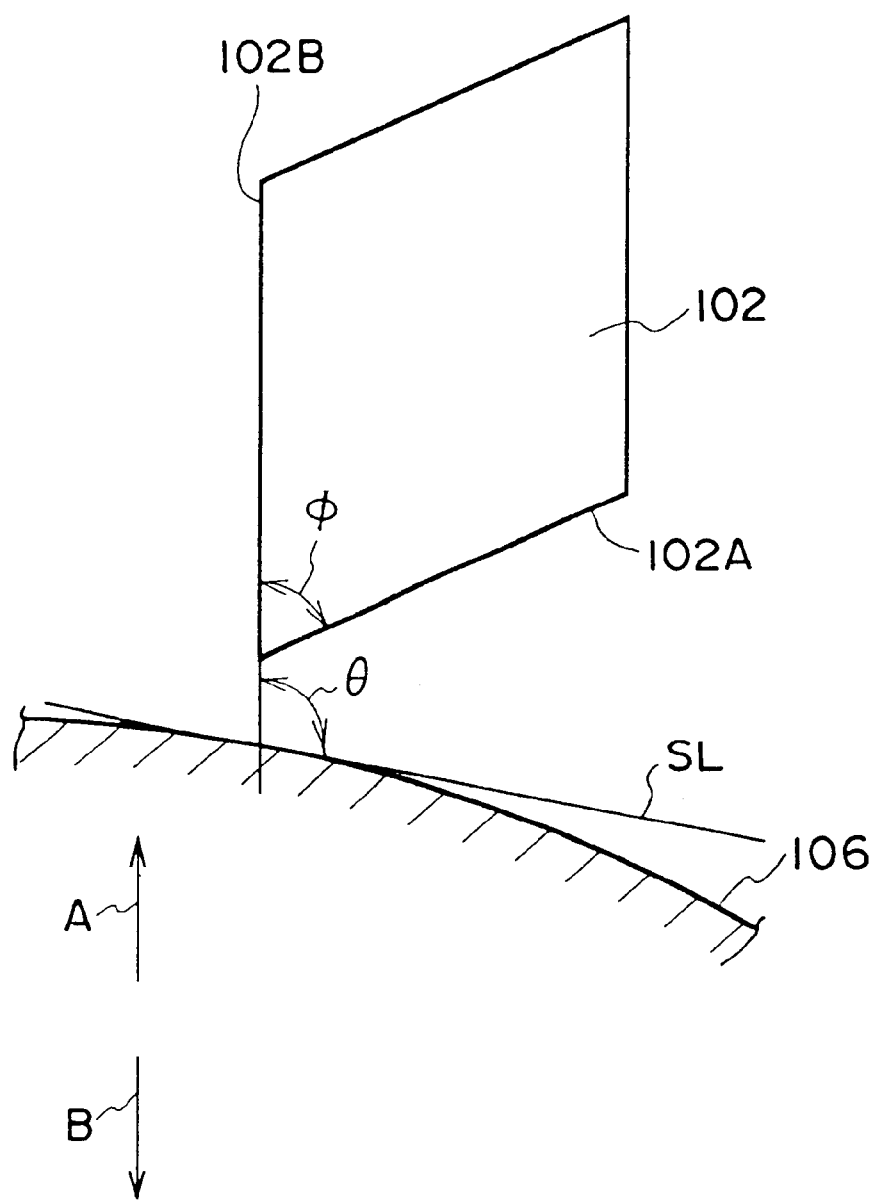

F I G. 14A
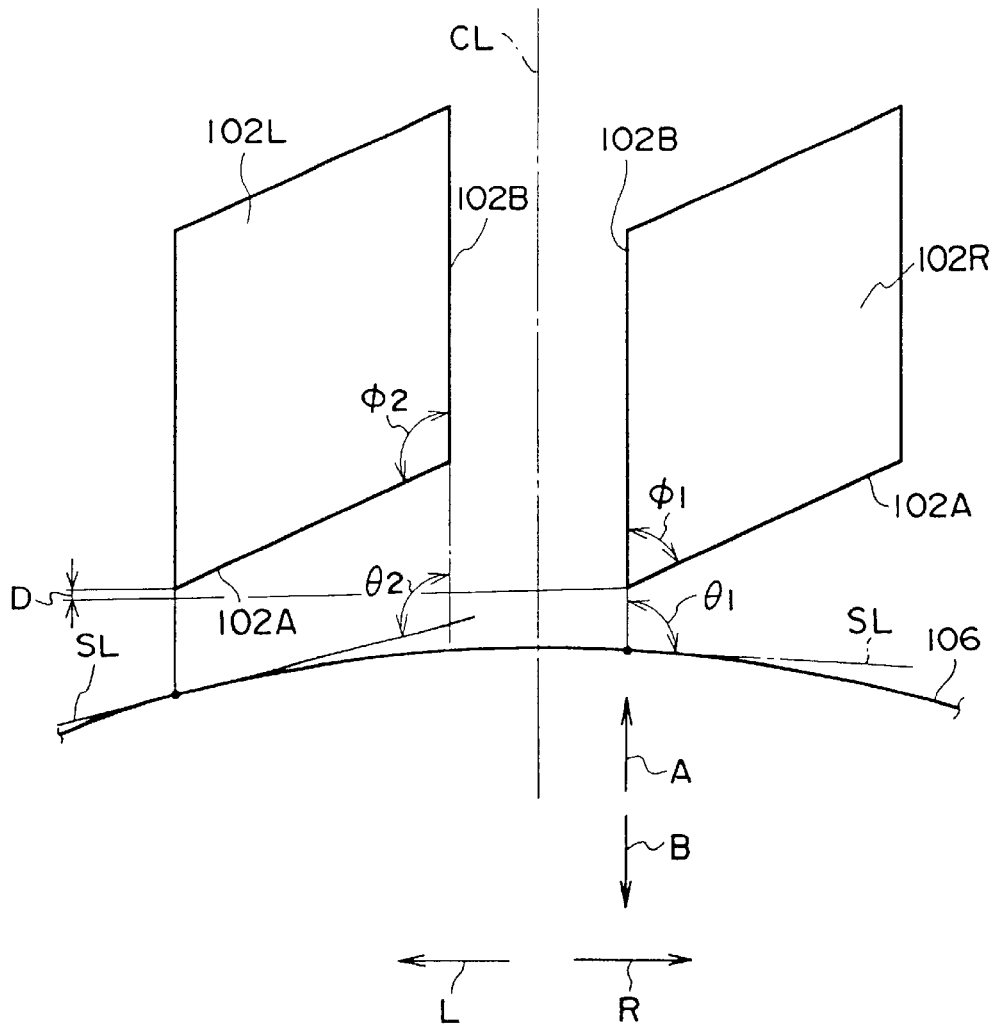
F I G. 14B
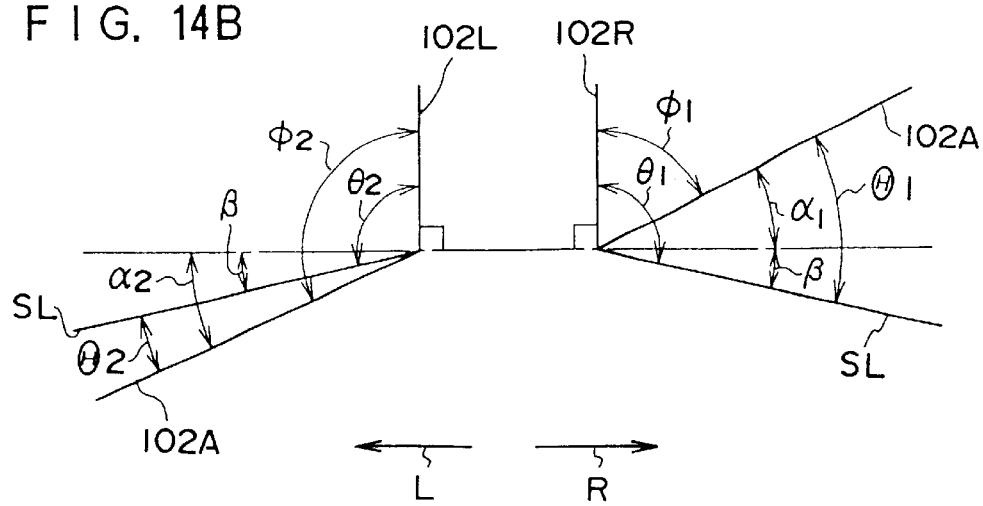

F I G. 15
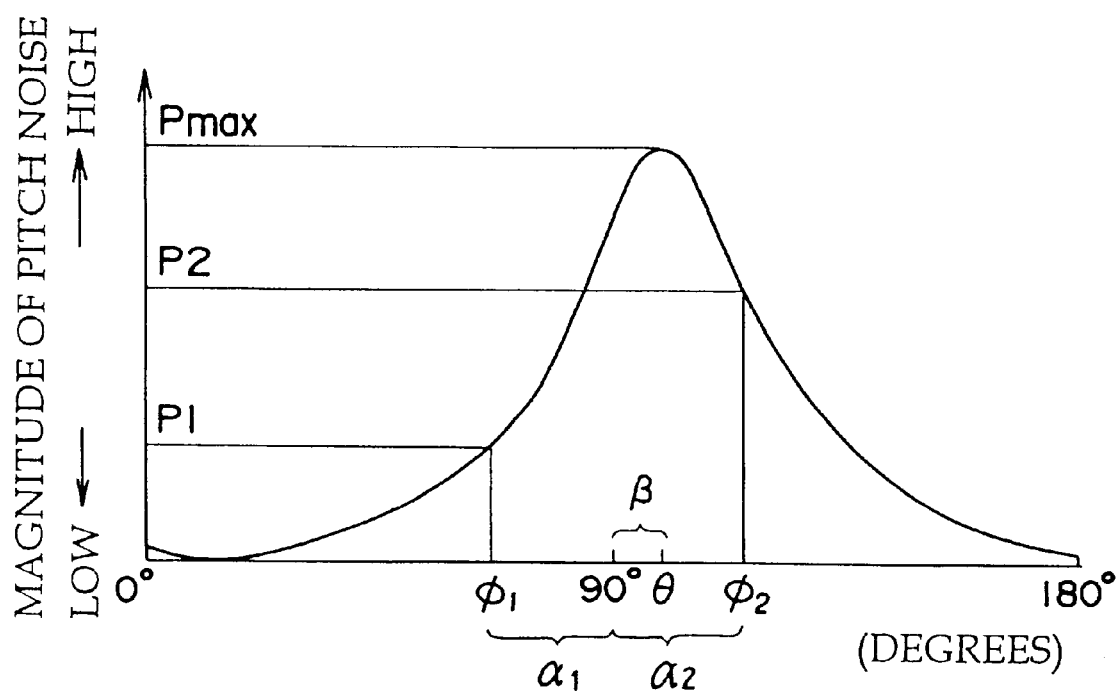

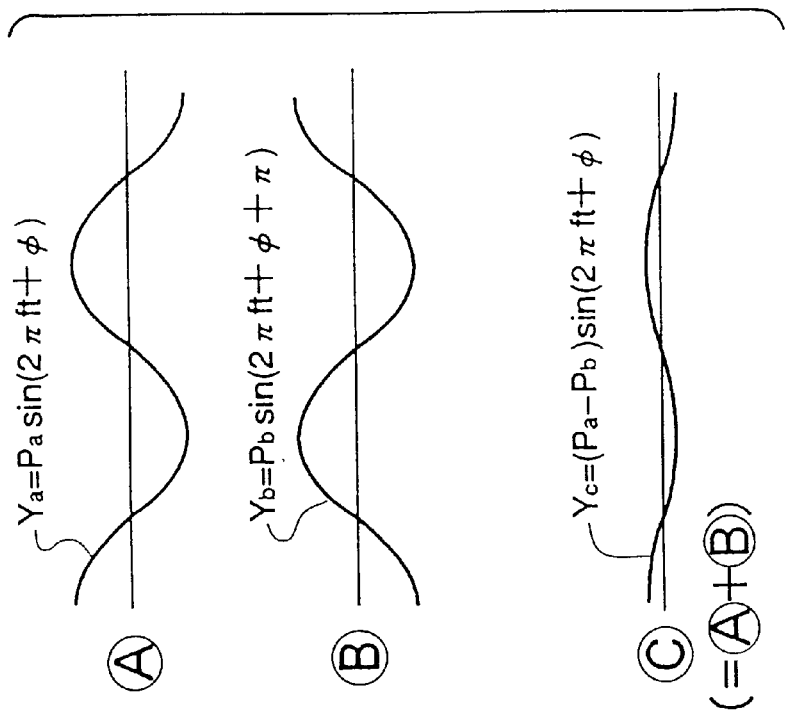
F I G. 16A
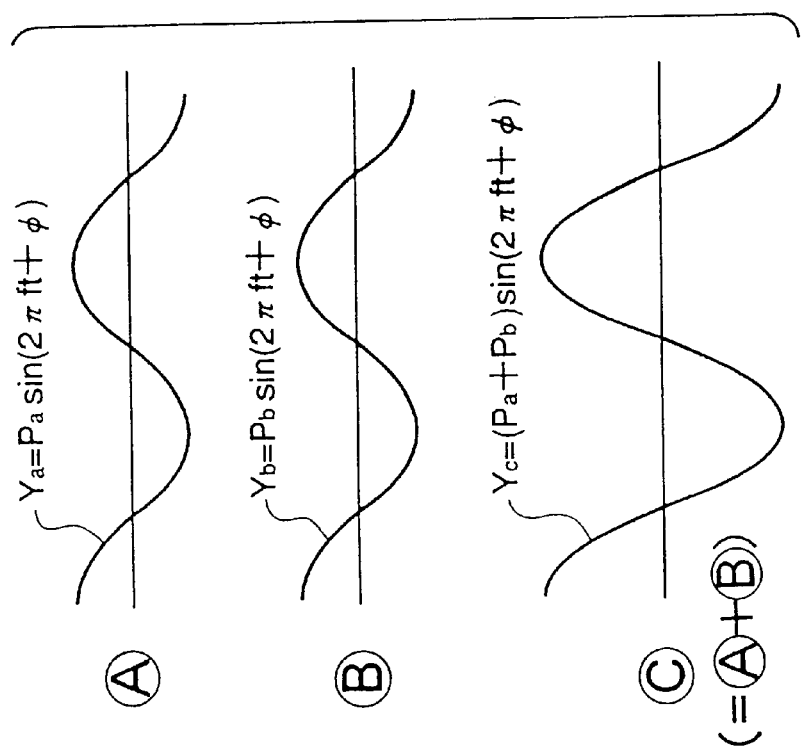
F I G. 16B

F I G. 17
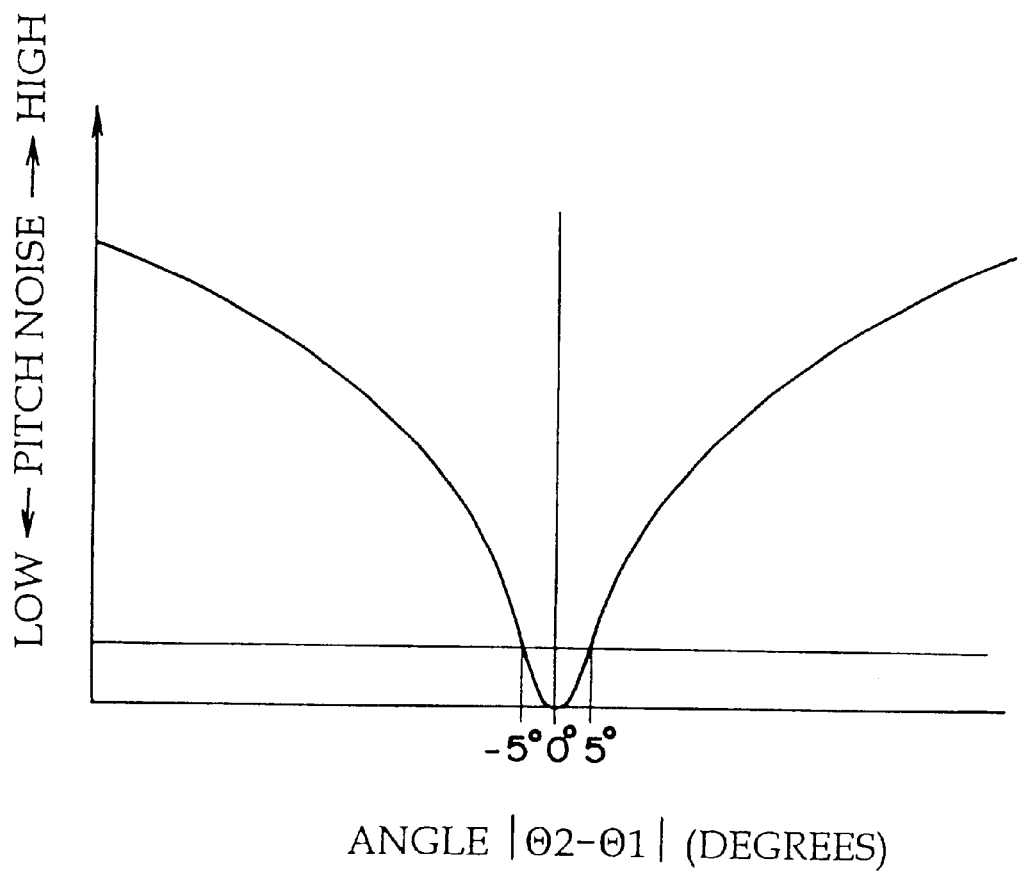

PNEUMATIC TIRE

BACKGROUND OF THE INVENTION

1. Field of the Invention

The present invention relates to a pneumatic tire, and more particularly, to a pneumatic tire in which pattern noise is reduced while other properties (in particular, performance on wet road surfaces) are maintained.

2. Description of the Related Art

Lug grooves, which endow a pneumatic tire with performance on wet road surfaces and resistance to hydroplaning in particular, are indispensable to pneumatic tires.

However, due to the existence of lug grooves, pitch noise (impact noise) is generated at the time the leading (step-in) edge of a block of the pneumatic tire contacts a road surface.

Various studies have been conducted in order to determine methods of reducing the pattern noise generated from the lug grooves (pitch noise being the main type of pattern noise). In particular, pitch variation, transverse direction phase offsetting, and the like have been studied in an attempt to reduce pattern noise.

Generally, there is a correlation between the negative ratio, the sound level, and the performance on wet road surfaces. If the negative ratio is reduced, the sound level improves, but the performance on wet road surfaces deteriorates. If the negative ratio is increased, the performance on wet road surfaces improves, but the sound level deteriorates.

SUMMARY OF THE INVENTION

In view of the aforementioned, an object of the present invention is to provide a pneumatic tire in which pattern noise can be reduced without a deterioration in the performance on wet road surfaces.

As illustrated in FIG. 10, impact noise is generated when a tire 100 rotates and a block 102 contacts a road surface 104. (Hereinafter, this impact noise will be called "pitch noise", and the waveform thereof is illustrated in FIG. 11.)

When the pattern of a tread is being designed, the angle of the edge portion of the block is an important factor. Therefore, the present inventors studied the angle of the block edge portion.

Due to the existence of lug grooves, pitch noise is generated when the leading edge of a block contacts the road surface.

It is known that the magnitude of the pitch noise is determined by the angle formed by the tire leading edge side contour line of the ground-contact configuration and the side surface of the block leading edge side.

More specifically, as illustrated in FIG. 12, when an angle $\theta$ (hereinafter, "ground-contact angle $\theta$"), which is formed by a tire leading edge side contour line 106 of the ground contact configuration and the tire circumferential direction (the direction of arrow A and the direction of arrow B), is equal to an angle $\phi$ of the leading edge of the block 102 (the angle formed by a side surface 102A of the leading edge side of the block 102 and the tire circumferential direction), i.e., when the tire leading edge side contour line 106 of the ground-contact configuration and the side surface 102A of the leading edge side of the block 102 are parallel (i.e., when $\phi=\theta$), as illustrated in FIG. 13, the pitch noise is greatest. When the tire leading edge side contour line 106 of the ground-contact configuration and the side surface 102A of the leading edge side of the block 102 are orthogonal (i.e., when the difference between $\theta$ and $\phi$ is 90°), the pitch noise is lowest. (Note that in a case in which the tire leading edge side contour line is curved, as shown in FIG. 12, the ground-contact angle $\theta$ is the angle formed by the tire circumferential direction and a tangent line SL which passes through a point tangent to the block 102 leading edge (the end portion which first contacts the ground).)

The angular difference between $\theta$ and $\phi$ is important to the reduction of pitch noise.

Here, the relationship between the tire leading edge side contour line 106 of the ground-contact configuration and the side surface 102A of the leading edge side of the block is considered.

First, in a case in which blocks are provided at the left and right of the tire equatorial plane, the angles at the respective portions are set as illustrated in FIGS. 14A and 14B. Namely, with respect to a block 102R at the right side of a tire equatorial plane CL, the angles are defined in the clockwise direction. The angle at the block leading edge is $\phi 1$, and the ground-contact angle formed by the tire circumferential direction and the tire leading edge side contour line 106 of the ground-contact configuration is $\theta 1$.

On the other hand, with respect to a block 102L at the left side of the tire equatorial plane CL, the angles are defined in the counterclockwise direction. The angle at the block leading edge is $\phi 2$, and the ground-contact angle formed by the tire circumferential direction and the tire leading edge side contour line 106 of the ground-contact configuration is $\theta 2$.

The positional relationships among the tire leading edge side contour line 106, the side surface 102A of the leading edge side of the block 102R at the right side of the tire equatorial plane CL, and the side surface 102A of the leading edge side of the block 102L at the left side of the tire equatorial plane CL, are as follows.

Assuming that $\beta>0°$, $\alpha 1>0°$, and $\alpha 2>0°$, then $\theta 1=90°+\beta$, $\theta 2=90°+\beta$, $\phi 1=90°-\alpha 1$, and $\phi 2=90°+\alpha 2$.

As described above, the angular difference between the ground-contact angle $\theta$ and the angle $\phi$ of the block leading edge is important to pitch noise. The angular difference $\Theta 1$ of the block 102 at the right side of the tire equatorial plane CL is $\Theta 1=\theta 1-\phi 1=\beta+\alpha 1$, and the angular difference $\Theta 2$ of the block 102 at the left side of the tire equatorial plane CL is $\Theta 2=\phi 2-\theta 2=\alpha 2-\beta$. The relationship between the angles and the magnitude of the pitch noise is as shown in FIG. 15.

FIG. 15 illustrates that pitch noise of a magnitude P1 is generated from the block 102 at the right side of the tire equatorial plane CL, and pitch noise of a magnitude P2 is generated from the block 102 at the left side of the tire equatorial plane CL. ($\Theta 2<\Theta 1$, and therefore, the magnitudes of the pitch noise are P2>P1.)

One conventional method of reducing pitch noise centers around the tire transverse direction phase offsetting of blocks. In the present invention as well, the phases of the left and right blocks are offset by a dimension D in the tire circumferential direction.

By providing a phase difference for respective pitch noises generated from block rows of blocks (generally, pairs of left and right blocks with respect to an axis extending along the tire circumferential direction (e.g., the tire equatorial plane CL)), the sounds can cancel each other out. The necessary extent of the phase difference differs in accordance with the configurations or the like of respective tires, and is determined for each tire.

As illustrated in FIGS. 16A and 16B, two sounds (Ⓐ and Ⓑ) are completely reverse phases. When the magnitude of the amplitude Pa and the magnitude of the amplitude Pb are equal, the magnitude of the combined sound is a minimum (FIG. 16B). However, when there is a difference between the amplitudes, the magnitude of the combined sound is not zero, and a sound having a magnitude of an amplitude |Pa−Pb| remains (see FIG. 16A).

It can thus be understood that, in order to make the phase offsetting effect a maximum, the magnitudes of the amplitudes of the sounds generated by the respective subject blocks must be equal.

Here, in FIGS. 14A and 14B, the angles of inclination of the lug grooves are equal, i.e., the side surface 102A of the leading edge side of the block 102L at the left side of the tire equatorial plane CL and the side surface 102A of the leading edge side of the block 102R at the right side of the tire equatorial plane CL are substantially parallel (i.e., $\alpha 1 \approx \alpha 2$). The angular difference $\Theta 1$ of the block 102R at the right side of the tire equatorial plane CL and the angular difference $\Theta 2$ of the block 102L at the left side of the tire equatorial plane CL are not the same. Sounds of different magnitudes are generated at the respective sides of the tire equatorial plane CL. Even if a block positional relationship is set in which the left and right blocks are offset in the tire circumferential direction so that the sounds at the respective sides become have reverse phases, a sound having the amplitude (P2−P1) remains.

Accordingly, in order to make the sounds from the left and right blocks to be the same magnitude and to exhibit the maximum phase offset effect, it is necessary for the angular difference $\Theta 1$=the angular difference $\Theta 2$.

Here, there are several conditions which satisfy the angular difference $\Theta 1$=the angular difference $\Theta 2$.

To briefly explain by using the example of FIGS. 14A and 14B, it suffices for $\beta + \alpha 1 = \alpha 2 - \beta$. Here, $\beta$ is an angle determined unambiguously from the ground-contact configuration, and a is an angle selected arbitrarily (an angle which can be changed by changing the configuration of the block). For example, if $\alpha 2$ is fixed and $\alpha 1$ is made small, or if $\alpha 1$ is fixed and $\alpha 2$ is made large, the equation $\beta + \alpha 1 = \alpha 2 - \beta$ is established. The magnitude of the pitch noise generated if $\alpha 2$ is fixed and $\alpha 1$ is made small is P2, and the magnitude of the pitch noise generated if $\alpha 1$ is fixed and $\alpha 2$ is made large is P1.

From the standpoint of phase offsetting, both the method of fixing $\alpha 2$ and making $\alpha 1$ small and the method of fixing $\alpha 1$ and making $\alpha 2$ large are the same. However, it can be understood that it is preferable to select the method of fixing $\alpha 1$, whose pitch noise is small, and making $\alpha 2$ large in both cases.

One aspect of the present invention is a pneumatic tire comprising: a first block row in which a plurality of blocks projecting from an outer circumference of the pneumatic tire are disposed along a tire circumferential direction; and a second block row in which a plurality of blocks projecting from the outer circumference of the pneumatic tire are disposed along the tire circumferential direction, the second block row being parallel to the first block row, wherein a side surface of a leading edge side end portion of each block of the first block row and the second block row is inclined with respect to a tire transverse direction such that an angle, which is formed by the side surface of the leading edge side end portion of each block of the first block row and a tire leading edge side contour line of a ground-contact configuration, and an angle, which is formed by the side surface of the leading edge side end portion of each block of the second block row and the tire leading edge side contour line of the ground-contact configuration, are substantially equal. Therefore, the pitch noise generated at the time of step-in at the blocks of the first block row is substantially the same level as the pitch noise generated at the time of step-in at the blocks of the second block row.

Therefore, by adjusting the tire circumferential direction phases of the blocks of the first block row and the blocks of the second block row, the pitch noises of substantially the same level will interfere with one another and cancel out one another, and the pattern noise of the tire can be reduced.

In the present invention, because there is no need to change the negative ratio, the performance on wet road surfaces and operational stability do not deteriorate.

In another aspect of the present invention, in the pneumatic tire of the previously-described aspect, given that the angle formed by the side surface of the leading edge side of each block of one block row and the tire leading edge side contour line is $\Theta 1$ and the angle formed by the side surface of the leading edge side of each block of the other block row and the tire leading edge side contour line is $\Theta 2$, the relation $|\Theta 2 - \Theta 1| \leq 5°$ is satisfied.

As a result of investigating the relationship between the value of $\Theta 2 - \Theta 1$ and the pitch size by changing the angle $\phi$ of the block leading edge to various values, the results illustrated in FIG. 17 were obtained. From FIG. 17, it is clear that by making $|\Theta 2 - \Theta 1| \leq 5°$, the pattern noise of the pneumatic tire could be reduced sufficiently.

In the pneumatic tire of this aspect, $|\Theta 2 - \Theta 1| \leq 5°$, wherein $\Theta 1$ is the angle formed by the tire leading edge side contour line and the side surface of the leading edge side of a block of one block row, and $\Theta 2$ is the angle formed by the tire leading edge side contour line and the side surface of the leading edge side of a block of another block row. Therefore, the pattern noise of the tire can be reliably decreased.

It is even more preferable that $|\Theta 2 - \Theta 1| \leq 2°$.

BRIEF DESCRIPTION OF THE DRAWINGS

FIG. 12 is a view for explaining a block leading edge angle and a ground-contact angle.

FIGS. 14A and 14B are views for explaining ground-contact angles and angles of leading edges of two blocks at either side of a tire equatorial plane.

FIG. 15 is a graph illustrating the relationship between an angle and pitch noise.

FIGS. 16A and 16B are views for explaining a method of reducing pitch noise.

FIG. 17 is a graph illustrating the relationship between $\Theta 1-\Theta 2$ and pitch noise.

DESCRIPTION OF THE PREFERRED EMBODIMENTS

First Embodiment

Figure 1A:
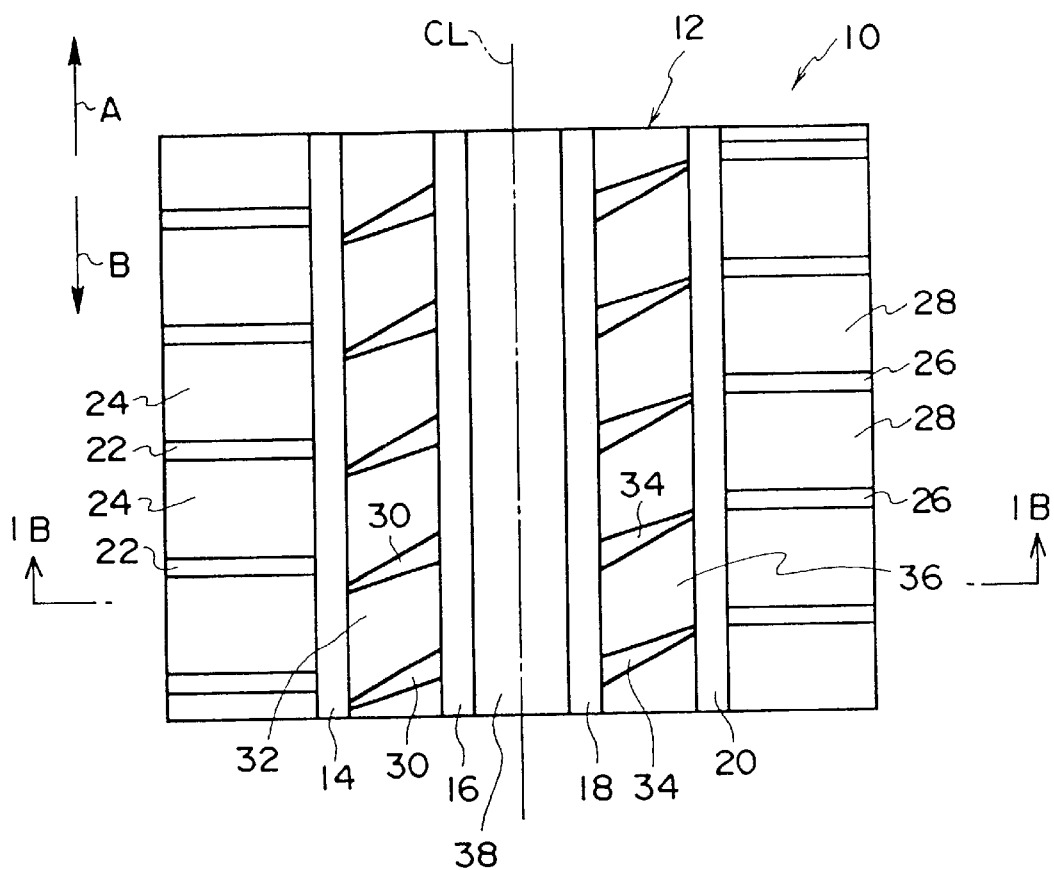
FIG. 1A is a plan view of a tread of a pneumatic tire relating to a first embodiment of the present invention, as seen from an exterior of the pneumatic tire.
Figure 1B:
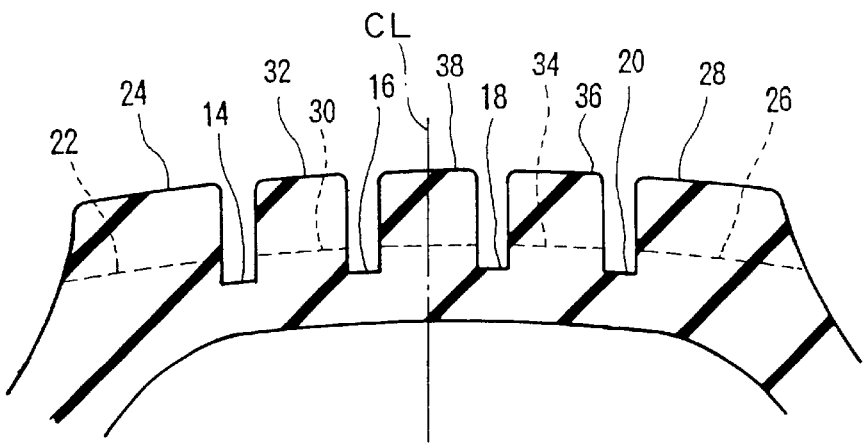
FIG. 1B is a cross-sectional view taken along line 1B—1B of FIG. 1A (and illustrating only the contour of the cross-section and not the internal structure).

As illustrated in FIGS. 1A and 1B, at a tread 12 of a pneumatic tire 10 (tire size: PSR 225/50R16) of the present first embodiment, circumferential direction grooves 14, 16, 18, 20 which extend along the tire circumferential direction (the direction of arrow A and the direction of arrow B) are formed in that order from the tire transverse direction left side (the side in the direction of arrow L) toward the transverse direction right side (the side in the direction of arrow R).

At the tread 12, shoulder blocks 24, which are defined by lug grooves 22 which are parallel to the tire transverse direction, are provided at the arrow L direction side of the circumferential direction groove 14. Shoulder blocks 28, which are defined by lug grooves 26 which are parallel to the tire transverse direction, are provided at the arrow R direction side of the circumferential direction groove 20.

Second blocks 32, which are defined by lug grooves 30 which are inclined upwardly to the right with respect to the tire transverse direction, are formed between the circumferential direction groove 14 and the circumferential direction groove 16. Second blocks 36, which are defined by lug grooves 34 which are inclined upwardly to the right with respect to the tire transverse direction, are formed between the circumferential direction groove 18 and the circumferential direction groove 20.

A rib 38, which is continuous along the tire circumferential direction, is formed between the circumferential direction groove 16 and the circumferential direction groove 18.

Figure 2:
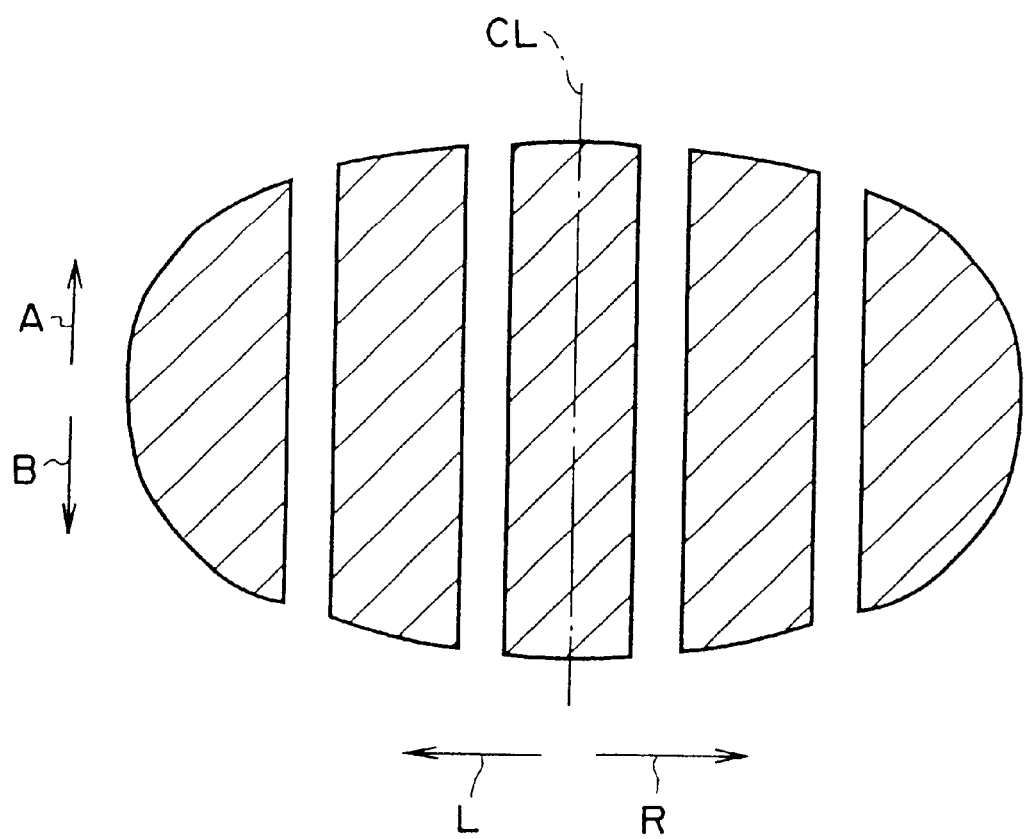
FIG. 2 illustrates a ground-contact configuration of the pneumatic tire relating to the first embodiment.

The ground-contact configuration of the pneumatic tire 10 is substantially oval as illustrated in FIG. 2. (The vertical lines in FIG. 2 are the traces of the circumferential direction grooves. The traces of the lug grooves are omitted from the figure.)

Figure 3A:
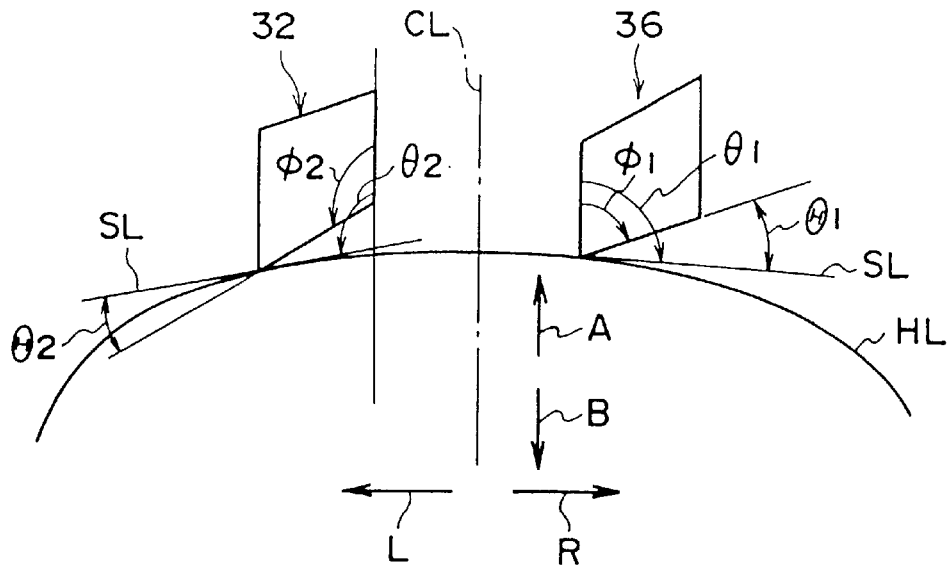
FIG. 3A is a view for explaining a relationship of angles of the ground-contact configuration and second blocks (wherein, for convenience of explanation, left and right second blocks are shown in a state in which there is no offset in the tire circumferential direction).
Figure 3B:
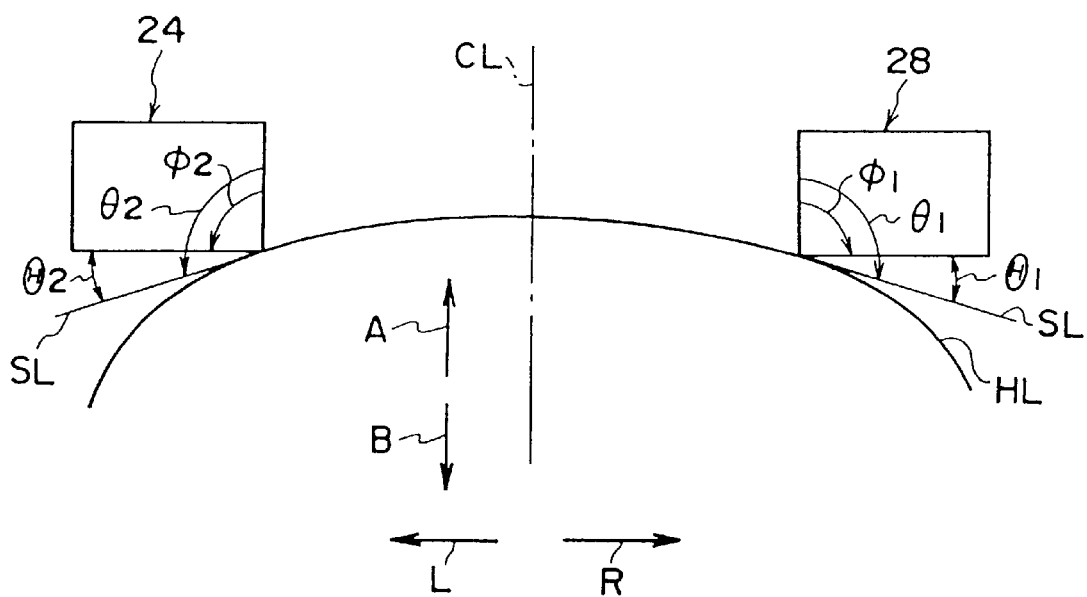
FIG. 3B is a view for explaining a relationship of angles of the ground-contact configuration and shoulder blocks (wherein, in the same way as in FIG. 3A, left and right shoulder blocks are shown in a state in which there is no offset in the tire circumferential direction).

The following angles, which are illustrated in FIGS. 3A and 3B, as well as the widths of the lug grooves 22, 26, 30, 34 are as per following Table 1: the ground-contact angle $\theta 1$ of the second block 36 and the shoulder block 28 at the right side of the tire equatorial plane CL, the leading edge angle $\phi 1$ of the second block 36 and the shoulder block 28 at the right side of the tire equatorial plane CL, the ground-contact angle $\theta 2$ of the second block 32 and the shoulder block 24 at the left side of the tire equatorial plane CL, the leading edge angle $\phi 2$ of the second block 32 and the shoulder block 24 at the left side of the tire equatorial plane CL, the angle $\Theta 2$ formed by the side surface of the leading edge side of the second block 32 and the shoulder block 24 at the left side of the tire equatorial plane CL and by a tangent line SL tangent to a tire leading edge side contour line HL (i.e., the angle of the difference between the angle $\phi 2$ and the ground-contact angle $\theta 2$), and the angle $\Theta 1$ formed by the side surface of the leading edge side of the second block 36 and the shoulder block 28 at the right side of the tire equatorial plane CL and by the tangent line SL tangent to the tire leading edge side contour line HL (i.e., the angle of the difference between the angle $\phi 1$ and the ground-contact angle $\theta 1$).

Note that the tire rotating direction is the direction of arrow B.

TABLE 1

|  | Conventional Example 1 | | Embodiment 1 | | Comparative Example 1 | |
| --- | --- | --- | --- | --- | --- | --- |
|  | second block | shoulder block | second block | shoulder block | second block | shoulder block |
| Ground-contact angles $\theta 1, \theta 2$ | 95° | 120° | 95° | 120° | 95° | 120° |
| Block leading edge angle $\phi 1$ | 70° | 70° | 72.5° | 90° | 62.5° | 70° |
| Block leading edge angle $\phi 2$ | 110° | 110° | 117.5° | 90° | 107.5° | 110° |
| $\Theta 1$ ($|\theta 1-\phi 1|$) | 25° | 50° | 22.5° | 30° | 32.5° | 50° |
| $\Theta 2$ ($|\phi 2-\theta 2|$) | 15° | 10° | 22.5° | 30° | 12.5° | 10° |
| $|\Theta 1-\Theta 2|$ | 10° | 40° | 0° | 0° | 20° | 40° |
| Lug groove width inner side | 6 mm | 6 mm | 9 mm | 6 mm | 3 mm | 6 mm |
| Lug groove width outer side | 6 mm | 6 mm | 3 mm | 6 mm | 9 mm | 6 mm |
| Pattern noise (as measured by instrument) | control | | −1.2 dB | | +0.5 dB | |
| Pattern noise (as evaluated by feeling) | 100 | | 120 | | 90 | |
| Performance on wet road surfaces | 100 | | 100 | | 100 | |

In order to confirm the effects of the present invention, an Embodiment 1 tire to which the present invention was applied, a Conventional Example 1 tire, and a Comparative Example 1 tire were prepared, and the pattern noises and performances on wet road surfaces thereof were compared.

Figure 4:
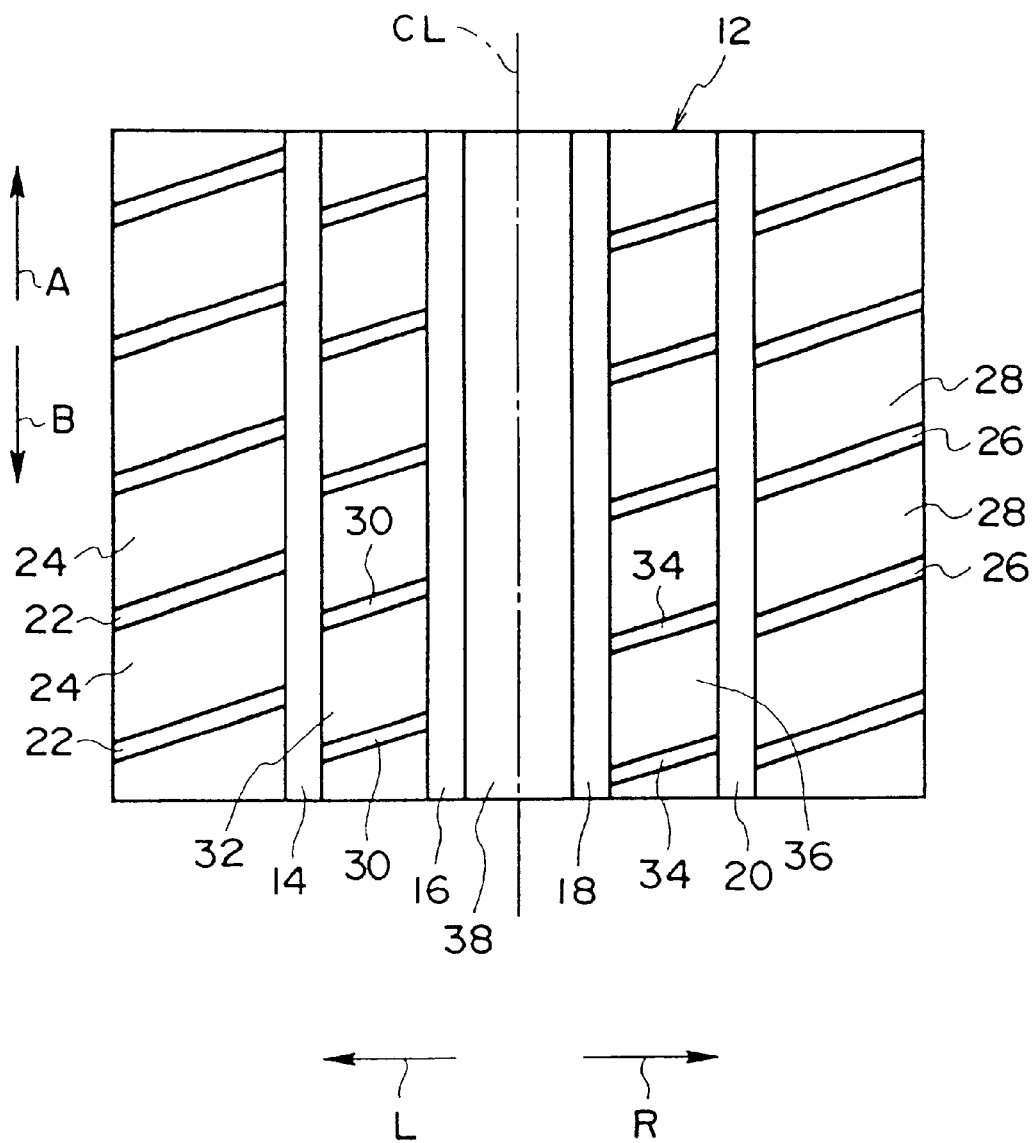
FIG. 4 is a plan view of a tread of a pneumatic tire relating to a conventional example.
Figure 5:
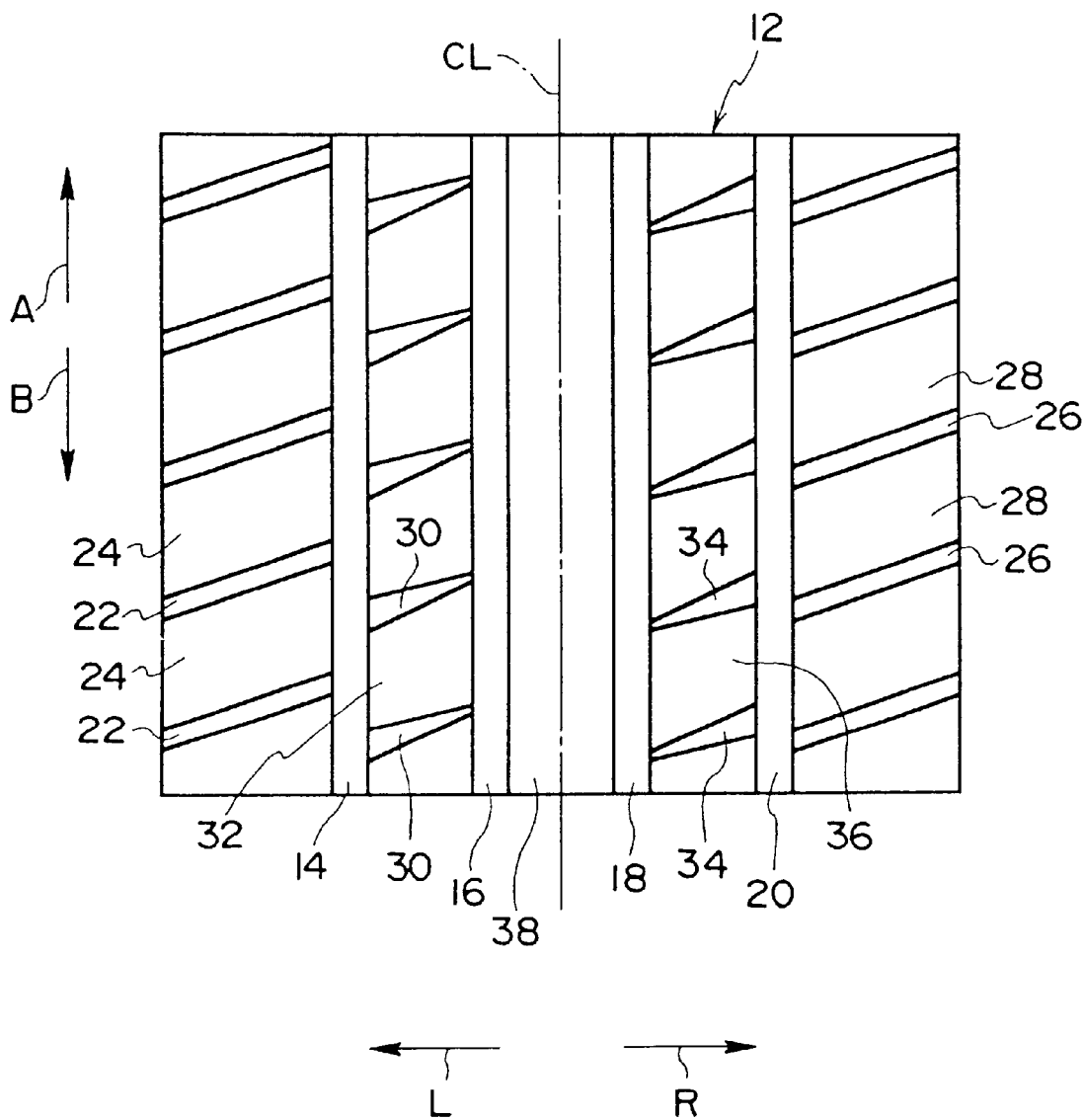
FIG. 5 is a plan view of a tread of a pneumatic tire relating to a comparative example.

The pattern of the Conventional Example 1 tire was as shown in FIG. 4, and the pattern of the Comparative Example 1 tire was as shown in FIG. 5. The angles of the respective regions and the like were as shown in above Table 1.

Each of the tires used in the experiments was the same size (PSR 225/50R16). The ground-contact configuration at the time the tire was mounted to a 7JJ rim, inflated to an internal pressure of 230 kPa, and subjected to a load of 400 kg was used. Each of the tires had the same negative ratio.

The pattern noise (as measured by instrument) was the measured value with a sound meter set within the driver's seat in a vicinity of the position of a driver's ear at the time the vehicle was allowed to coast on a straight, flat road after reaching a speed of 55 km/h.

The pattern noise (as evaluated by feeling) was the results of evaluation by the senses of a vehicle occupant under the same conditions as described above. These results were expressed as indices with the Conventional Example 1 tire having a value of 100, and the higher the value, the better the feeling (i.e., the less unpleasant).

The performance on wet road surfaces was evaluated by the time required for a vehicle to pass over a 90 m section of a wet road surface with a depth of water of 5 mm, while zigzagging through 5 pylons. The results were expressed as indices with the time of the Conventional Example 1 tire being an index of 100. The higher the value, the shorter the time, and the better the performance on wet road surfaces.

As measured by the noise meter, the Embodiment 1 tire to which the present invention was applied had a pattern noise which was 1.2 dB lower than the Conventional Example 1 tire, and the Comparative Example 1 tire had a pattern noise which was 0.5 dB higher than the Conventional Example 1 tire. Further, the pattern noise of the Embodiment 1 tire also exhibited good results when evaluated by the feeling of the vehicle occupant.

It is clear that the reason why the pattern noise of the present Embodiment 1 tire was low is that the magnitudes of the pitch noises generated from the blocks were set to be the same at the left and right of the tire equatorial plane CL ($|\Theta 1-\Theta 2|=0$) such that the pattern noises canceled each other out.

It is clear that the reason why the pattern noise of the Comparative Example 1 tire was high is that the magnitudes of the pitch noises generated from the blocks differed greatly at the left and right of the tire equatorial plane CL (i.e., $|\Theta 1-\Theta 2|$ was large).

From the standpoint of feeling as well, the pattern noise of the Embodiment 1 tire to which the present invention was applied was less than that of the Conventional Example 1 tire and the Comparative Example 1 tire.

Further, with regard to the performance on wet road surfaces, the Embodiment 1 tire, the Conventional Example 1 tire, and the Comparative Example 1 tire were all the same.

When the direction of rotation of the tire is the direction opposite to that described above (i.e., when the direction of rotation of the tire is the direction of arrow A), the angles are set in the same way, and there is no directionality with respect to the mounting of the tire. Therefore, the groove widths of the lug grooves 30, 34 are not parallel to each other.

Second Embodiment

A second embodiment of the present invention will be described hereinafter with reference to FIGS. 6 and 7.

Figure 6:
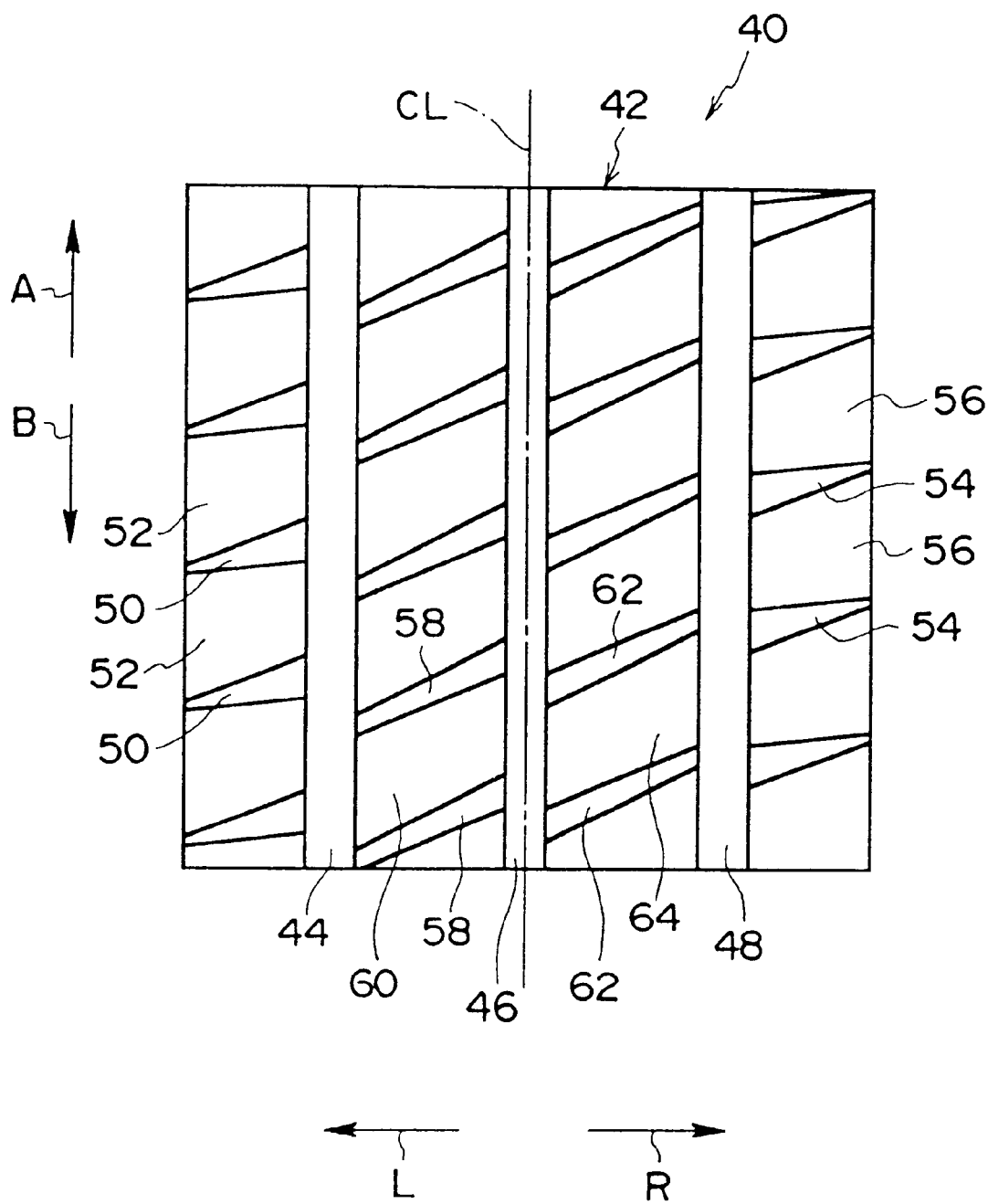
FIG. 6 is a plan view of a tread of a pneumatic tire relating to a second embodiment of the present invention.

As illustrated in FIG. 6, at a tread 42 of a pneumatic tire 40 (tire size: PSR 195/65R14) of the present second embodiment, circumferential direction grooves 44, 46, 48, which extend along the tire circumferential direction (the direction of arrow A and the direction of arrow B), are formed in that order from the tire transverse direction left side (the side in the direction of arrow L) toward the tire transverse direction right side (the side in the direction of arrow R).

At the tread 42, shoulder blocks 52 defined by lug grooves 50 are disposed at the arrow L direction side of the circumferential direction groove 44. Shoulder blocks 56 defined by lug grooves 54 are disposed at the arrow R direction side of the circumferential direction groove 48.

Second blocks 60 defined by lug grooves 58 are formed between the circumferential direction groove 44 and the circumferential direction groove 46. Second blocks 64 defined by lug grooves 62 are formed between the circumferential direction groove 46 and the circumferential direction groove 48.

Figure 7:
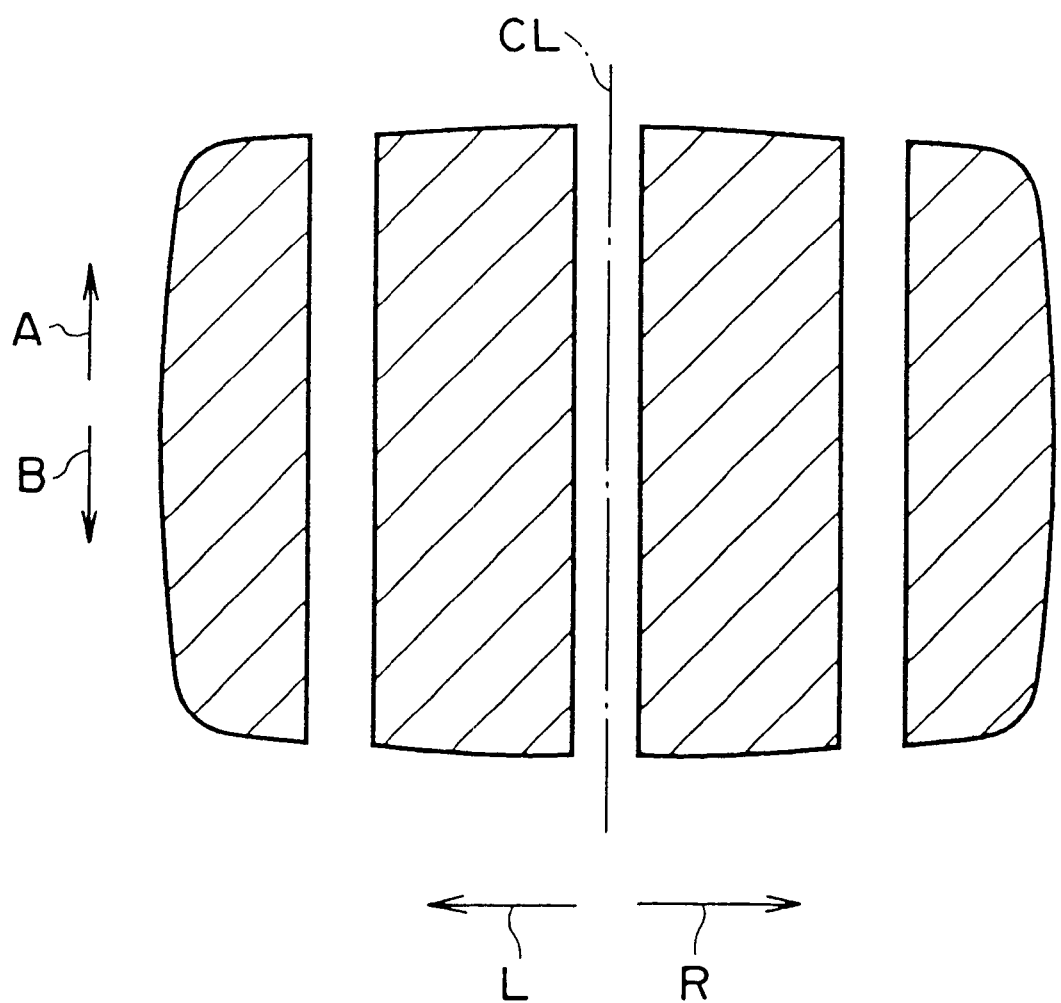
FIG. 7 illustrates a ground-contact configuration of the pneumatic tire relating to the second embodiment.

The ground-contact configuration of the pneumatic tire 40 is a substantial rectangle having slightly rounded corners as illustrated in FIG. 7. (The vertical lines in FIG. 7 are the traces of the circumferential direction grooves. The traces of the lug grooves are omitted from the figure.)

Figure 8:
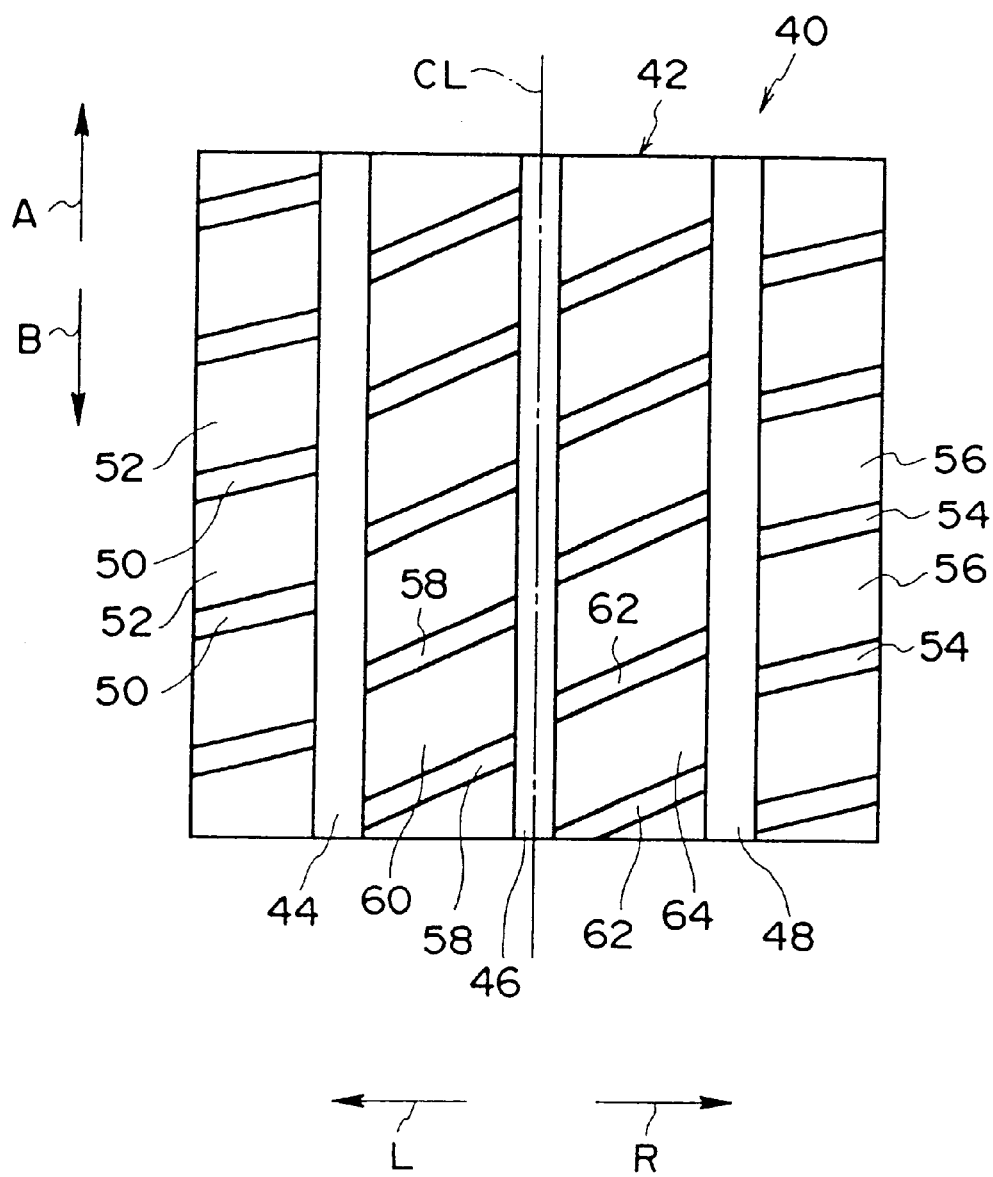
FIG. 8 is a plan view of a tread of a pneumatic tire relating to a conventional example.
Figure 9:
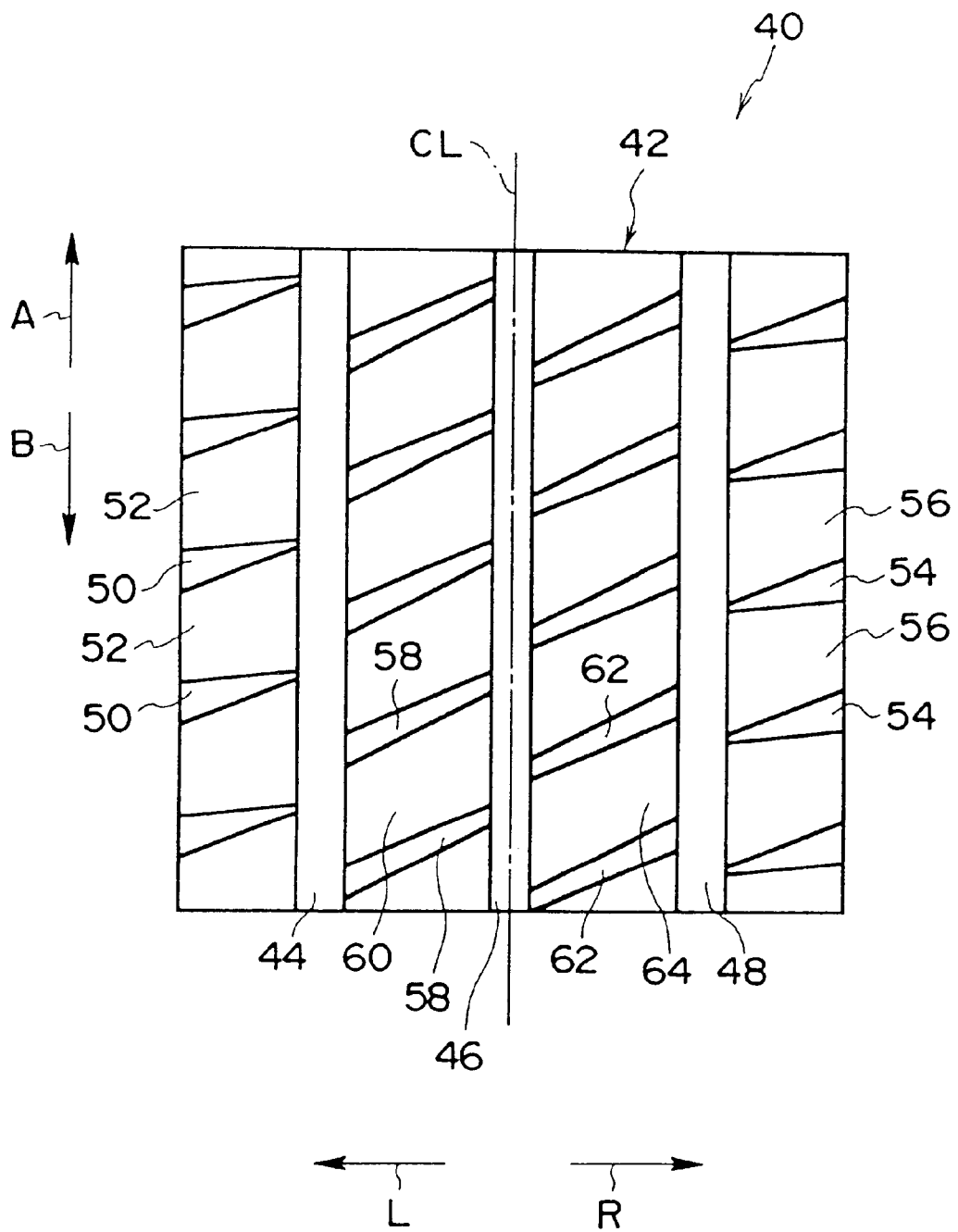
FIG. 9 is a plan view of a tread of a pneumatic tire relating to a comparative example.
Figure 10:
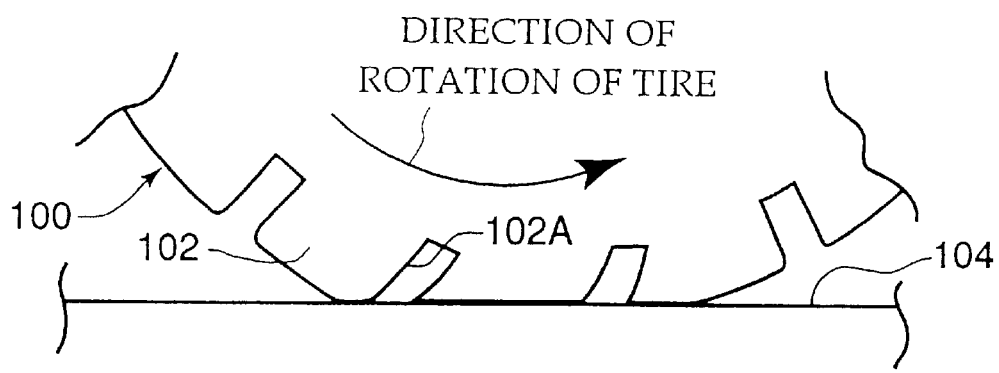
FIG. 10 is a view for explaining a pitch noise generating mechanism.
Figure 11:
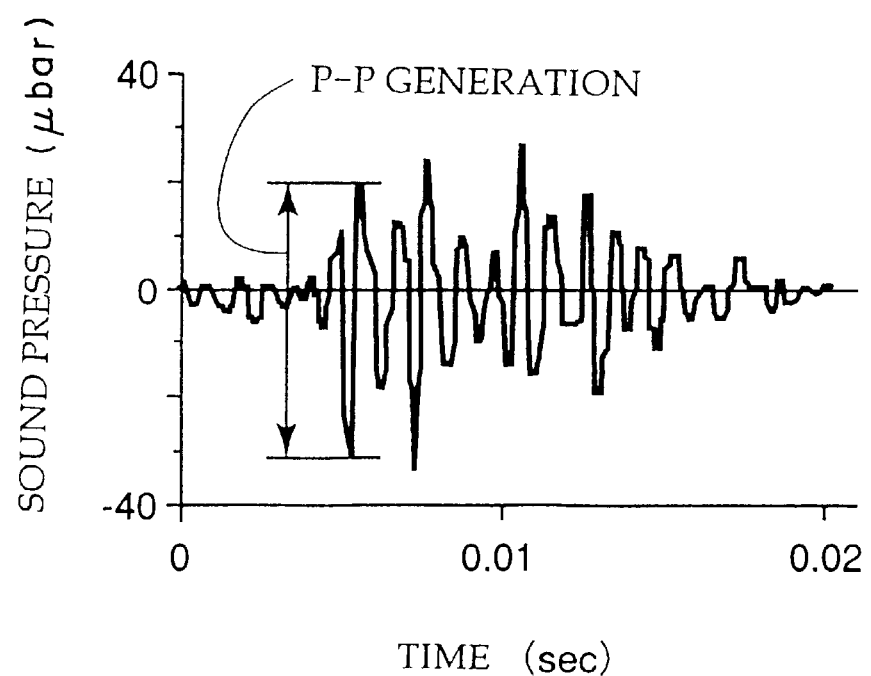
FIG. 11 illustrates an example of measurement of pitch noise.
Figure 13:
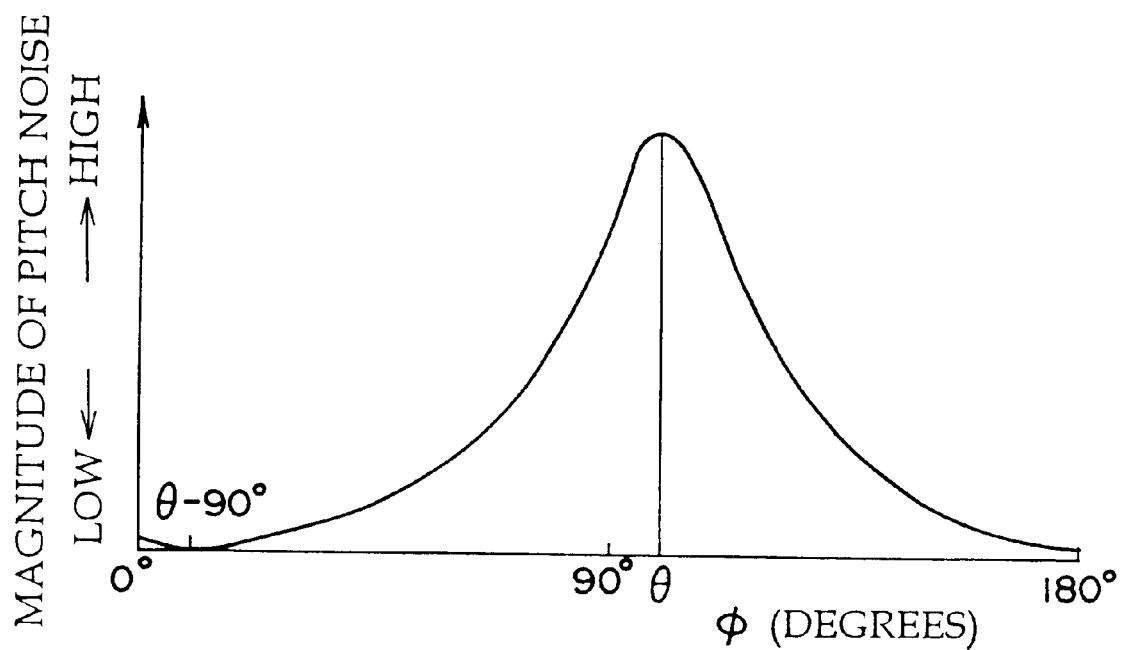
FIG. 13 is a graph illustrating the relationship between a block leading edge angle, a ground-contact angle, and pitch noise.

The pneumatic tire 40 of Embodiment 2, a pneumatic tire 66 of Conventional Example 2 having the pattern illustrated in FIG. 8, and a pneumatic tire 68 of Comparative Example 2 having the pattern illustrated in FIG. 9 were manufactured and were tested in the same way as in the first embodiment.

The methods of measuring the angles and the like of the respective portions were the same as in the first embodiment. The angles and dimensions of the respective portions and the results of the experiments are shown in following Table 2.

TABLE 2

|  |  | Conventional Example 2 | | Embodiment 2 | | Comparative Example 2 | |
| --- | --- | --- | --- | --- | --- | --- | --- |
|  |  | second block | shoulder block | second block | shoulder block | second block | shoulder block |
| Ground-contact angles $\Theta 1$, $\Theta 2$ of ground-contact configuration leading edge | | 92° | 98° | 92° | 98° | 92° | 98° |
| Block leading edge angle $\phi 1$ | | 65° | 75° | 67° | 83° | 63° | 67° |
| Block leading edge angle $\phi 2$ | | 115° | 105° | 117° | 113° | 113° | 97° |
| $\Theta 1$ ($|\Theta 1-\phi 1|$) | | 27° | 23° | 25° | 15° | 29° | 31° |
| $\Theta 2$ ($|\phi 2-\Theta 2|$) | | 23° | 7° | 25° | 15° | 21° | 1° |
| $|\Theta 1-\Theta 2|$ | | 4° | 16° | 0° | 0° | 8° | 30° |
| Lug groove width | inner side | 8 mm | 8 mm | 10 mm | 13 mm | 6 mm | 3 mm |
|  | outer side | 8 mm | 8 mm | 6 mm | 3 mm | 10 mm | 13 mm |
| Pattern noise (as measured by instrument) | | control | | −1.1 dB | | +0.9 dB | |
| Pattern noise (as evaluated by feeling) | | 100 | | 120 | | 80 | |
| Performance on wet road surfaces | | 100 | | 100 | | 100 | |

It is clear that the reason why the pattern noise of the Embodiment 2 tire was low is that the magnitudes of the pitch noises generated from the blocks were set to be the same at the left and right of the tire equatorial plane CL ($|\Theta 1-\Theta 2|=0$) such that the pattern noises canceled each other out, in the same way as in the first embodiment.

It is clear that the reason why the pattern noise of the Comparative Example 2 tire was high is that the magnitudes of the pitch noises generated from the blocks differed greatly at the left and right of the tire equatorial plane CL (i.e., $|\Theta 1-\Theta 2|$ was large).

From the standpoint of feeling as well, the pattern noise of the Embodiment 2 tire to which the present invention was applied was less than that of the Conventional Example 2 tire and the Comparative Example 2 tire.

The performances on wet road surfaces of the Embodiment 2 tire, the Conventional Example 2 tire, and the Comparative Example 2 tire were all the same.

What is claimed is:

1. A pneumatic tire comprising:
    a first block row in which a plurality of blocks projecting from an outer circumference of said pneumatic tire are disposed along a tire circumferential direction; and a second block row in which a plurality of blocks projecting from the outer circumference of said pneumatic tire are disposed along the tire circumferential direction, said second block row being parallel to said first block row,
wherein a side surface of a leading edge side end portion of each block of said first block row and said second block row is inclined with respect to a tire transverse direction such that an angle, which is formed by the side surface of the leading edge side end portion of each block of said first block row and a tire leading edge side contour line of a ground-contact configuration, and an angle, which is formed by the side surface of the leading edge side end portion of each block of said second block row and the tire leading edge side contour line of the ground-contact configuration, are substantially equal, the side surfaces of the leading edge side end portions of said blocks are separated from adjacent blocks by tire transverse direction lug grooves formed in a tread surface, and for each of said lug grooves, one tire transverse direction end thereof is narrow and another tire transverse direction end thereof is wide.

2. A pneumatic tire according to claim 1, wherein each of said lug grooves of a block row is formed such that a width thereof at a side facing the other block row is wide.

3. A pneumatic tire comprising:
a first block row in which a plurality of blocks projecting from an outer circumference of said pneumatic tire are disposed along a tire circumferential direction; and
a second block row in which a plurality of blocks projecting from the outer circumference of said pneumatic tire are disposed along the tire circumferential direction, said second block row being parallel to said first block row,
wherein a side surface of a leading edge side end portion of each block of said first block row and said second block row is inclined with respect to a tire transverse direction such that an angle, which is formed by the side surface of the leading edge side end portion of each block of said first block row and a tire leading edge side contour line of a ground-contact configuration, and an angle, which is formed by the side surface of the leading edge side end portion of each block of said second block row and the tire leading edge side contour line of the ground-contact configuration, are substantially equal, wherein each block of said first block row and said second block row has a configuration which is quadrilateral in plan view, tire transverse direction edges of each block are parallel, and tire circumferential direction edges of each block are non-parallel.

4. A pneumatic tire comprising:
a first block row in which a plurality of blocks projecting from an outer circumference of said pneumatic tire are disposed along a tire circumferential direction; and
a second block row in which a plurality of blocks projecting from the outer circumference of said pneumatic tire are disposed along the tire circumferential direction, said second block row being parallel to said first block row,
a third block row and a fourth block row, and wherein said third block row and said fourth block row are disposed at opposite sides of a tire equatorial plane, and leading edges of blocks of said third block row and said fourth block row are parallel to the tire transverse direction,
wherein a side surface of a leading edge side end portion of each block of said first block row and said second block row is inclined with respect to a tire transverse direction such that an angle, which is formed by the side surface of the leading edge side end portion of each block of said first block row and a tire leading edge side contour line of a ground-contact configuration, and an angle, which is formed by the side surface of the leading edge side end portion of each block of said second block row and the tire leading edge side contour line of the ground-contact configuration, are substantially equal.

5. A pneumatic tire comprising:
a first block row in which a plurality of blocks projecting from an outer circumference of said pneumatic tire are disposed along a tire circumferential direction; and
a second block row in which a plurality of blocks projecting from the outer circumference of said pneumatic tire are disposed along the tire circumferential direction, said second block row being disposed at a side of an equatorial plane, which is a tire transverse direction center, opposite a side at which said first block row is disposed, and said second block row being asymmetric to said first block row with respect to the equatorial plane,
a side surface of a leading edge side end portion of each block of said first block row and said second block row is inclined with respect to a tire transverse direction such that, given that an angle formed by the side surface of the leading edge side end portion of each block of said first block row and a tire leading edge side contour line of a ground-contact configuration is $\Theta 1$ and an angle formed by the side surface of the leading edge side end portion of each block of said second block row and the tire leading edge side contour line of the ground-contact configuration is $\Theta 2$, the relation $|\Theta 2 - \Theta 1| \leq 5°$ is satisfied, and the side surfaces of the leading edge side end portions of said blocks are separated from adjacent blocks by tire transverse direction lug grooves formed in a tread surface; wherein for each of said lug grooves, one tire transverse direction end thereof is narrow and another tire transverse direction end thereof is wide.

6. A pneumatic tire according to claim 5, wherein each of said lug grooves of a block row is formed such that a width thereof at a side facing the other block row is wide.

7. A pneumatic tire comprising:
a first block row in which a plurality of blocks projecting from an outer circumference of said pneumatic tire are disposed along a tire circumferential direction; and
a second block row in which a plurality of blocks projecting from the outer circumference of said pneumatic tire are disposed along the tire circumferential direction, said second block row being disposed at a side of an equatorial plane, which is a tire transverse direction center, opposite a side at which said first block row is disposed, and said second block row being asymmetric to said first block row with respect to the equatorial plane,
a third block row and a fourth block row, and wherein said third block row and said fourth block row are disposed at opposite sides of a tire equatorial plane, and leading edges of blocks of said third block row and said fourth block row are parallel to the tire transverse direction,
wherein a side surface of a leading edge side end portion of each block of said first block row and said second block row is inclined with respect to a tire transverse direction such that, given than an angle formed by the side surface of the leading edge side end portion of each block of said first block row and a tire leading edge side contour line of a ground-contact configuration is $\Theta 1$ and an angle formed by the side surface of the leading edge side end portion of each block of said second block row and the tire leading edge side contour line of the ground-contact configuration is $\Theta 2$, the relation $|\Theta 2-\Theta 1|\leq 5°$ is satisfied.

8. A pneumatic tire in which a plurality of blocks, which are defined by a plurality of circumferential direction grooves extending along a tire circumferential direction and lug grooves inclined with respect to a tire transverse direction, are provided at a tread, and a plurality of block rows, in each of which a plurality of said blocks are disposed along the tire circumferential direction, are aligned in the tire transverse direction, wherein angles formed by a tire leading edge side contour line of a ground-contact configuration and a side surface of a leading edge side end portion of each block are substantially equal for at least one group of block rows, and for each of said lug grooves, one tire transverse direction end thereof is narrow and another tire transverse direction end thereof is wide.

9. A pneumatic tire in which a plurality of blocks, which are defined by a plurality of circumferential direction grooves extending along a tire circumferential direction and lug grooves inclined with respect to a tire transverse direction, are provided at a tread, and a plurality of block rows, in each of which a plurality of said blocks are disposed along the tire circumferential direction, are aligned in the tire transverse direction, wherein angles formed by a tire leading edge side contour line of a ground contact configuration and a side surface of a leading edge side portion of each block are substantially equal for at least one group of block rows, and wherein each block of said at least one group of block rows has a configuration which is quadrilateral in plan view, tire transverse direction edges of each block are parallel, and tire circumferential direction edges of each block are non-parallel.

* * * * *